United States Patent [19]

Nelson

[11] Patent Number: 5,002,226
[45] Date of Patent: Mar. 26, 1991

[54] THERMOSTAT WITH MECHANICAL HEAT ANTICIPATION AND DROOP CONTROL

[75] Inventor: Lorne W. Nelson, Bloomington, Minn.

[73] Assignee: Honeywell, Inc., Minneapolis, Minn.

[21] Appl. No.: 464,912

[22] Filed: Jan. 16, 1990

[51] Int. Cl.[5] ............................................. G05D 15/00
[52] U.S. Cl. ................................. 236/78 R; 236/68 B; 337/334
[58] Field of Search ............... 236/78 D, 68 B, 78 R; 165/26; 337/334

[56] References Cited

U.S. PATENT DOCUMENTS

| | | | |
|---|---|---|---|
| 2,181,957 | 12/1939 | Aldworth | 236/91 R X |
| 4,095,741 | 6/1978 | Mott | 236/78 C |
| 4,254,906 | 3/1981 | Hayes | 236/78 D |
| 4,441,545 | 4/1984 | Alley et al. | 165/26 |
| 4,489,882 | 12/1984 | Rodgers | 236/78 D |
| 4,524,908 | 6/1985 | Marshall et al. | 236/46 R |
| 4,682,648 | 7/1987 | Fried | 165/12 |
| 4,734,871 | 3/1988 | Tsunoda et al. | 364/557 |
| 4,784,319 | 11/1988 | Kaiser | 236/46 R |

Primary Examiner—William E. Wayner
Attorney, Agent, or Firm—Merchant, Gould, Smith, Welter & Schmidt

[57] ABSTRACT

An electromechanical thermostat for controlling the on/off cycle of a heating/cooling unit. The thermostat has a temperature sensing element with a variable position according to the sensed temperature. Associated with the sensing element is a switch member that provides on/off signals in response to the position of the sensing element. The thermostat has mechanical heat anticipation to control the generation of the on/off signals. In the preferred embodiment the mechanical heat anticipation is accomplished by a stepper motor which varies the position of either the sensing element or switch member to simulate thermal heat anticipation. The thermostat also has a mechanical structure to reduce or eliminate thermostat droop. Preferably this structure includes a control circuit to detect the duty cycle of the heating/cooling unit and mechanically and automatically adjusts the thermostat set point.

13 Claims, 3 Drawing Sheets

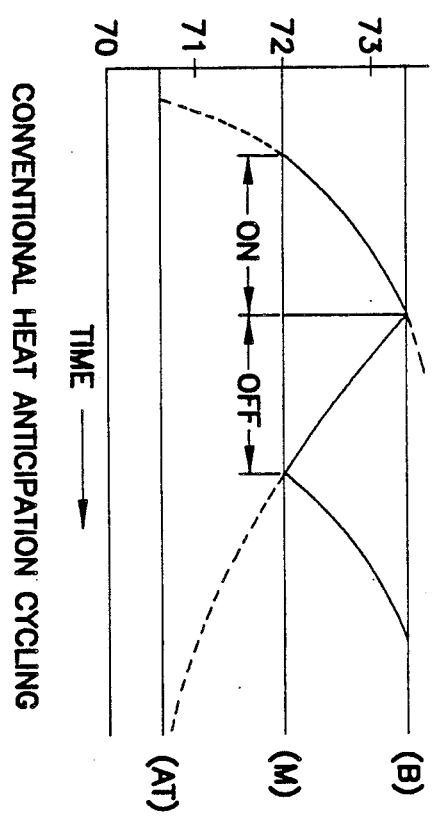
FIG. 1 CONVENTIONAL HEAT ANTICIPATION CYCLING
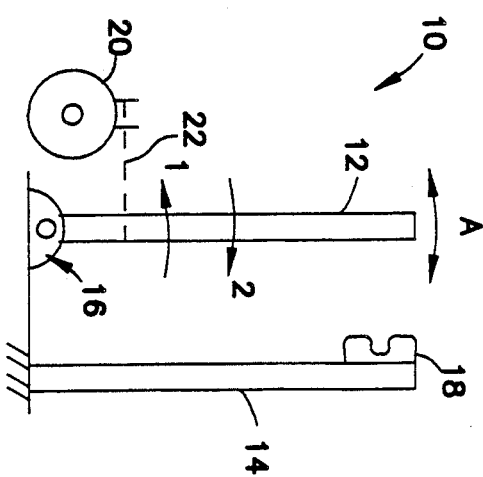
FIG. 2
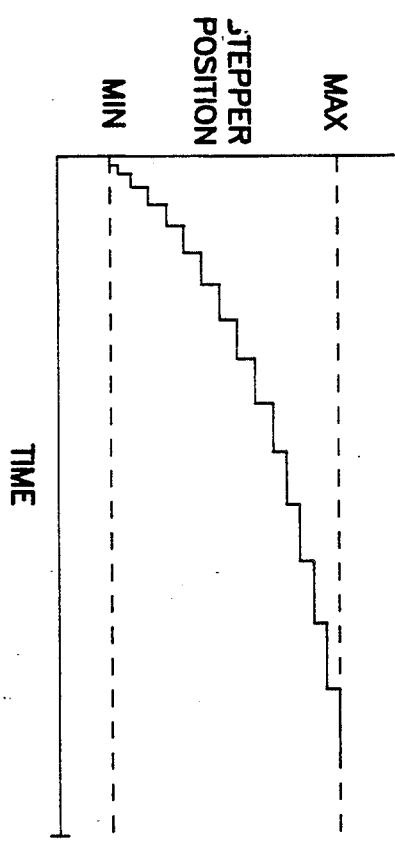
FIG. 3A
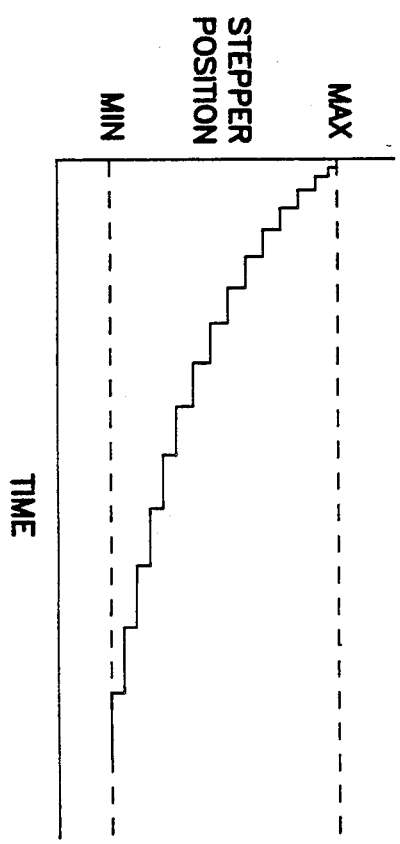
FIG. 3B

THERMOSTAT WITH MECHANICAL HEAT ANTICIPATION AND DROOP CONTROL

BACKGROUND OF THE INVENTION

The present invention relates to thermostats and, in particular, to an electromechanical thermostat incorporating mechanical heat anticipation and control or regulation of the droop characteristics of the thermostat, i.e., the difference between the thermostat set point and the ambient control temperature as a function of the duty cycle of the controlled heating and/or cooling power plant.

Electromechanical thermostats are those of the type having a temperature sensing element that responds mechanically to temperature changes. For example, the sensing element may comprise two dissimilar metals bonded together (bimetals) having unequal rates of expansion. One type of thermostat incorporating this sensing element concept has a bimetal coil with a fixed end and an end which is allowed to move as the bimetal expands in response to changes in temperature. The free end typically actuates a switch, such as a mercury switch, to turn the heating/cooling source on and off. Another example of this type of electromechanical thermostat is one having an elongated bimetal sensing contact fixed at one end with its opposite end moving under the influence of temperature changes into and out of engagement with a switch contact generating the heating/cooling unit on and off signals.

These types of thermostats embody what is referred to as heat anticipation. Heat anticipation is generally accomplished by a resistance heater which provides heat to the temperature sensing element during the time the unit is on during heating (or alternatively, while the unit is off during a cooling cycle). This increased temperature in the sensing element provides anticipation to the rise in ambient temperature causing the thermostat switch to open and turn off the heating unit before the ambient temperature increases sufficiently to break the contact. Without this heat anticipation the ambient temperature swings within the control space would become excessive because of the switch differential and the time lags of the sensing element and the heating system. Heat anticipation thus generates a proper cycling of on and off conditions.

Wireless thermostats may be used in retrofit applications. Typically in these applications the thermostats are not hard wired to circuitry that provides an adequate source of electrical power for a heat anticipation resistance heater. In such applications typically the electrical power available for the thermostat is a self-contained battery. The wireless thermostat incorporates a radio frequency transmitter that provides a communication control signal to a central receiver for heating/cooling unit control. The prior art includes solid state wireless thermostats with battery power operation. In the case of electromechanical thermostats the power necessary to generate heat anticipation in the conventional manner would cause an excessive drain on the self-contained battery.

Heat anticipation thermostats characteristically exhibit a difference between the thermostat set point and the ambient temperature at which the room is controlled. This is referred to as the "droop" characteristic. It occurs because in order to change the rate of heat input a temperature change has to be detected at the sensing element location. In the heating mode the offset or droop in the room control temperature increases as the ambient temperature decreases. Thus, the room becomes less comfortable. It is desirable to reduce or eliminate this droop. In a solid state thermostat as previously described this can be accomplished by detection of the droop of the heating/cooling unit and resetting the thermostat to reduce or eliminate the difference between the controlled temperature and set point. This has not previously been effectively accomplished with an electromechanical thermostatic device.

SUMMARY OF THE INVENTION

The present invention relates to an electromechanical thermostat having mechanical heat anticipation providing the desired heating/cooling unit cycling characteristics in the same manner as with thermal heat anticipation. Also, the present invention is an electromechanical thermostat having an electromechanical means to reduce or eliminate thermostat droop.

In the preferred embodiment the thermostat has a temperature sensing element in a position that varies according to the sensed temperature. A switch means associated with the sensing element and actuated by the sensing element provides on-off signals to the heating/cooling unit. A means is provided to automatically and mechanically change the relative positioning of the temperature sensing element and switch means providing mechanical heat anticipation to control the duty cycle of the heating/cooling unit. More particularly, the position changing means in the preferred embodiment is a low power stepper motor connected to one of the sensing elements or switch means to drive it in a first direction when the heating/cooling unit is on and in a second opposite direction when the unit is off.

The present invention also includes a means for detecting the duty cycle of the heating/cooling unit and means responsive to a control signal generated by the detecting means to automatically adjust the position of either the sensing element or switch means to adjust the difference between the thermostat set point and room control temperature to eliminate or reduce thermostat droop. In the preferred embodiment this adjustment means also is the stepper motor.

The present invention thus provides an electromechanical thermostat having mechanically generated heat anticipation and automatic adjustment to control or eliminate droop. The present invention finds particularly useful application in wireless applications. While in the preferred embodiment mechanical heat anticipation is achieved using a stepper motor, it should be understood that alternative displacement means include a controlled electrical force generated, for example, by an electric coil or using a piezoelectric actuator. These and other advantages of the present invention will become apparent with reference to the accompanying drawings, detailed description of the preferred embodiment, and claims.

BRIEF DESCRIPTION OF THE DRAWINGS

FIG. 1 illustrates the cycling characteristics of a conventional prior art heat anticipation thermostat;

FIG. 2 illustrates one embodiment of the operative elements of the thermostat of the present invention;

FIGS. 3A and 3B illustrate the displacement characteristics of the stepper motor of the preferred embodiment of the present invention to provide a mechanical heat anticipation function;

DETAILED DESCRIPTION OF THE PREFERRED EMBODIMENT

Figure 4:
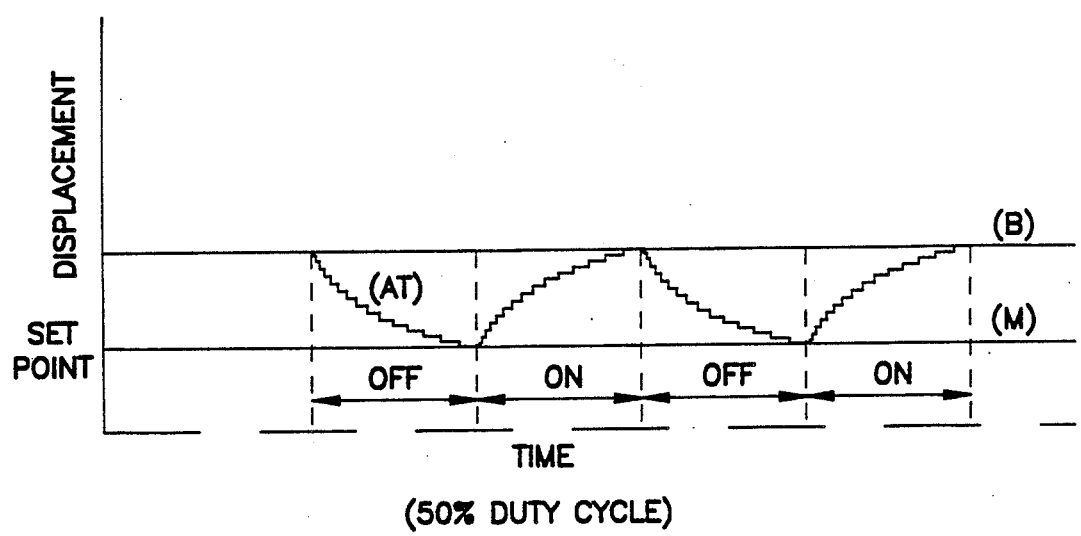
FIG. 4 illustrates the mechanical displacement characteristics of the stepper motor to provide heat anticipation with the heating/cooling unit operating at a fifty percent duty cycle.

FIG. 1 illustrates the cycling characteristics using a convention electromechanical thermostat with heat anticipation provided by a resistance heater. In FIG. 1 the Y-axis represents temperature and the X-axis represents time. The room or ambient temperature is represented by the line (AT). The ambient temperature is the temperature at which the room is controlled and in FIG. 1 this is 70.5 degrees. The thermostat set point is at 72 and is indicated by the line designated (M). This reflects the fact that the thermostat is set to make contact when the sensed temperature reaches 72 degrees to turn on the heating unit. The temperature represented at the line (B) is the breakpoint of the thermostat contacts or that point at which the contacts are designed open to turn the heating unit off. The curve shown in FIG. 1 thus represents the temperature sensed by the sensing element in the thermostat which in a typical electromechanical thermostat may be a bimetal contact. At 72 degrees when the heating unit is turned on in conventional thermal heat anticipation a resistance heater generates a thermal effect that is detected by the bimetal. When this sensed temperature reaches the breakpoint, the contacts open and the heating unit is turned off. When the temperature again drops to the make point (M), the contacts close, again turning on the heating unit. The thermostat cycles in this manner maintaining the ambient temperature at the level indicated by (AT). The difference between set point (M) and the room or ambient temperature (AT) is the thermostatic droop characteristic that will be described in more detail hereafter.

One embodiment of the essential mechanical elements of the present invention is shown in FIG. 2. There is illustrated an electromechanical thermostat 10 having a pair of contacts 12 and 14. Contact 12 is an elongated bimetal which is shown mounted for pivotal movement about 16. Contact 14 has a magnet at 18. A conventional prior art low power stepper motor is shown at 20. Motor 20 may be powered by a battery supply (not shown) in wireless applications such as retrofitting. Stepper motor 20 is connected to contact 12 by a mechanical interlock which may be any convenient known means at 22. Contact 12 senses temperature and the uneven expansion rates of the bimetal cause contact 12 to make and break with contact 14 as illustrated by the arrow A. The thermostat of FIG. 2 is also provided with a set point adjustment (not shown) which is typically a mechanical adjustment to establish the set point relative positions of contacts 12 and 14.

When thermostat 10 is on and operating to sense and control the on/off cycling of a heating/cooling unit, stepper motor 20 functions to change the position of contact 12 about its pivot 16 in opposite directions as indicated by the arrows numbered 1 and 2. When contacts 12 and 14 close to turn on the heating/cooling unit, stepper motor 20 through its mechanical interlock 22 with contact 12 begins to rotate contact 12 in the direction of arrow 1 about pivot 16 in incremental steps from the minimum (closed contact position) to a maximum as indicated in FIG. 3A. FIG. 3A shows the operation whereby the stepper motor changes the position of contact 12 in incremental steps from minimum to the maximum displacement of contact 12 and in an exponential fashion. The Y-axis in FIG. 3A shows the stepper position from minimum to a maximum displacement of contact 12 while the X-axis is a function of time. Stepper motor 20 is designed to generate gradually increasing incremental steps to mirror the exponential characteristic of conventional heat anticipation cycling. When contacts 12 and 14 open the direction of rotation or movement of stepper motor 20 is reversed. As illustrated in FIG. 3B the stepper motor causes incremental displacement in an exponential fashion of contact 12 in the direction indicated by the arrow 2 (in FIG. 2) from a maximum displacement to a minimum during the off cycle of the heating/cooling unit. The Y-axis of FIG. 3B shows the stepper position from maximum to minimum and the X-axis is again a function of time. As described previously with respect to FIG. 3A the stepper motor causes gradually increasing incremental steps to simulate an exponential heat anticipation function.

FIG. 4 illustrates the stepper motor cycling adjustment of the relative positions of contacts 12 and 14 to provide mechanical heat anticipation with the heating/cooling unit operating at a fifty percent duty cycle. The graph of FIG. 4 illustrates displacement as a function of time with the line (AT) illustrating the displacement of contact 12 between make position (M) and break position (B). The thermostat set point displacement is also shown in FIG. 4. The set point is also a function of the relative position of contacts 12 and 14 in FIG. 2. The set point, or the point at which the contacts make, is adjusted by adjusting the relative position between the contacts. For example, with reference to FIG. 2 set point adjustment could be provided on either contact 12 or contact 14. If it were on contact 14, contact 14 like contact 12 may also be pivotally mounted with set point adjustment accomplished by mechanically pivoting contact 14 with respect to contact 12. Set point adjustment could also be accomplished by providing a mechanical adjustment to pivot contact 12 about its pivotal axis 16.

Figure 5:
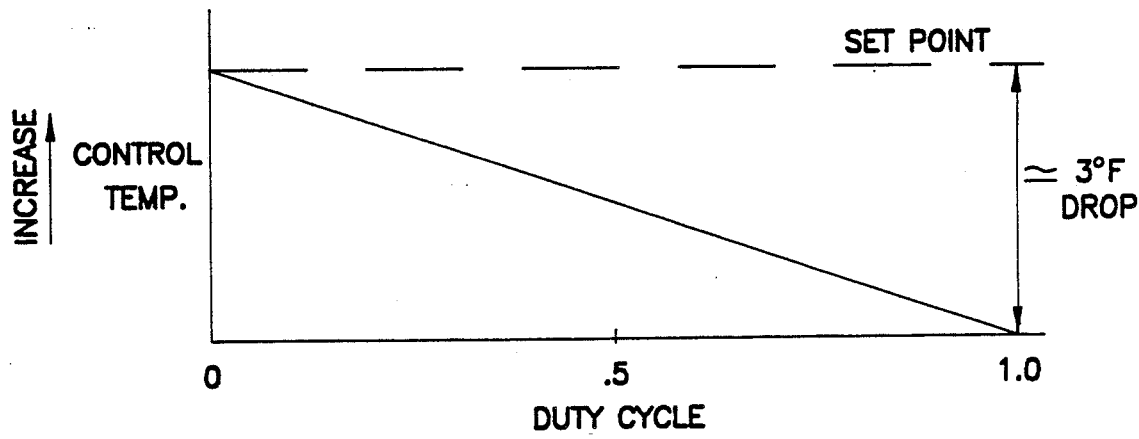
FIG. 5 is a graph showing typical thermost droop characteristics.

As previously discussed, in prior art electromechanical thermostats there is a difference between the thermostat set point and the room ambient or control temperature which is referred to as thermostat droop. This difference increases as the duty cycle increases because of the increased amount of thermostat anticipation heat during the heating mode. Likewise the droop increases as the dutY cycle decreases with the unit in the cooling mode. Typically the design maximum droop is three degrees F at which point the heating unit is operating at one hundred percent duty cycle. FIG. 5 is a graph showing the linear relationship between the thermostat droop in the prior art electromechanical thermostats as a function of the duty cycle. The room control temperature is plotted along the Y-axis with the X-axis representing the duty cycle. In the present invention the droop may be reduced or eliminated by automatically adjusting the relative displacement of the contacts to reduce the offset between the set point and control temperature to zero such as by set point readjustment.

Figure 6:
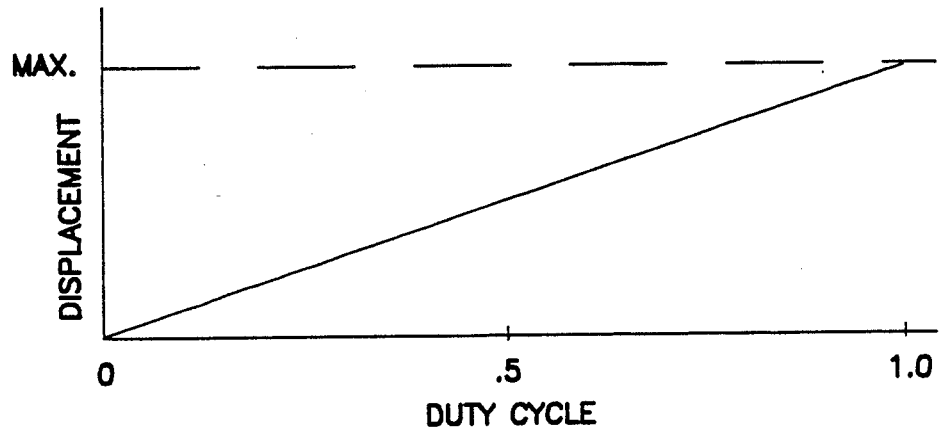
FIG. 6 illustrates stepper motor displacement to reduce thermostat droop as a function of the duty cycle.

To achieve this, as will be described in more detail with reference to FIG. 7, the duty cycle of the heating/cooling unit is monitored, and according to the duty cycle, in the embodiment of FIG. 2 the contact 12 is displaced with reference to contact 14 by stepper motor 20. FIG. 6 is a graph illustrating the displacement necessary to reduce the droop to zero as a function of duty cycle. For example, at 100% duty cycle, the displacement must be at a maximum value. As shown in FIG. 6 the relationship between displacement and duty cycle is linear. It is contemplated that the same stepper motor used for heat anticipation also may provide the dedroop adjustment. The droop adjustment is designed for a slow and gradual displacement so that it does not affect the more rapid cyclic displacement necessary for mechanical heat anticipation. A slow response or a long time constant thermal heater is difficult to achieve in small sizes thereby preventing this dedroop function in prior electromechanical thermostats. Alternatively, a second stepper motor could be used particularly if the droop adjustment is designed to cause displacement of contact 14 as opposed to contact 12.

It should be understood that the present invention can be used with other prior art electromechanical thermostat configurations in addition to that shown in FIG. 2. For example, the present invention can be easily incorporated into an electromechanical thermostat of the coiled bimetal type where one end of the bimetal coil is fixed and the other moves and actuates a switch such as a mercury switch. In this application the stepper motor would generate a rotational movement of the spiral bimetal for mechanical heat anticipation and droop control.

Figure 7:
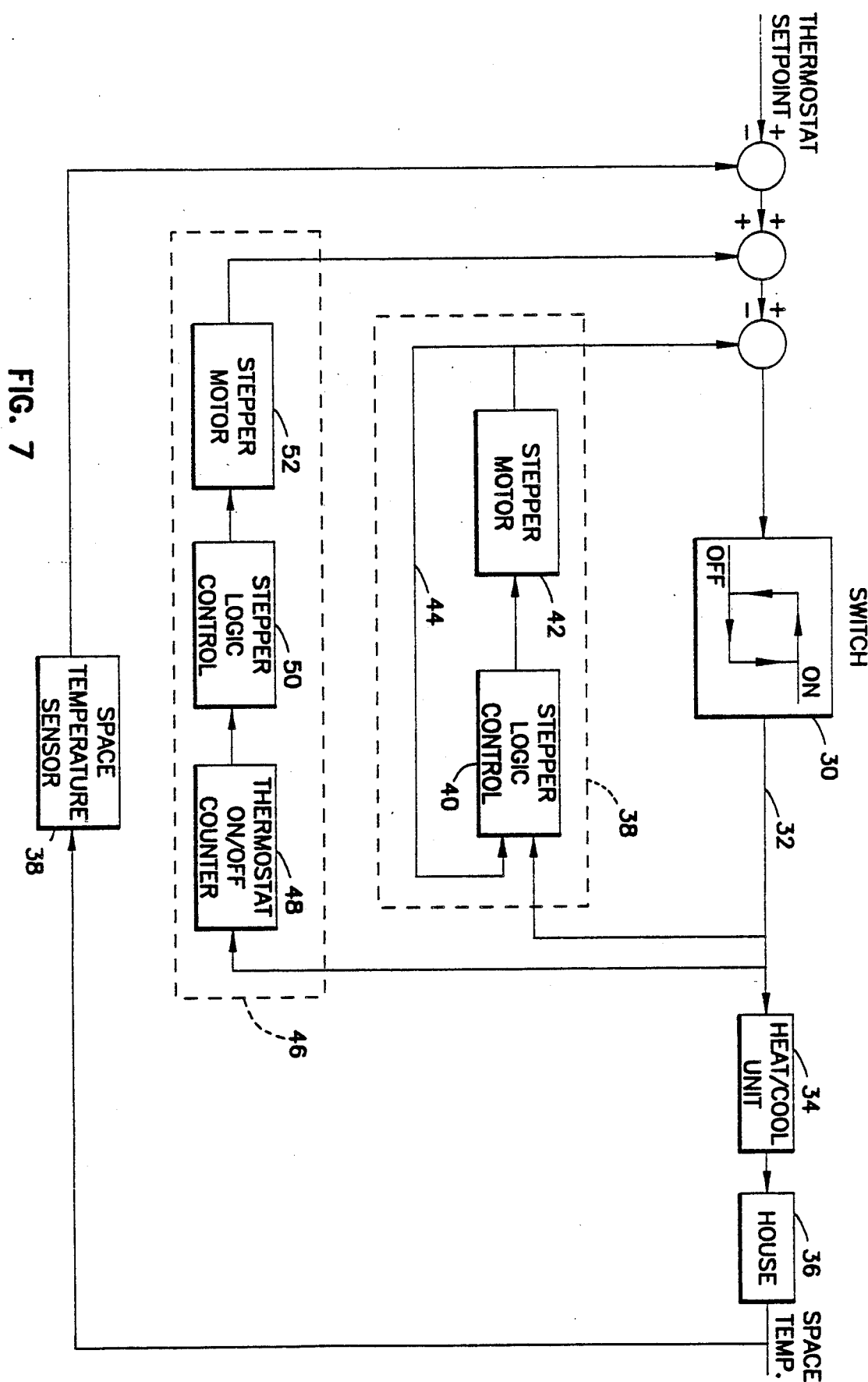
FIG. 7 is a block diagram illustrating in schematic form the control and the thermostat of the present invention.

FIG. 7 illustrates in block diagram form the control incorporated in the present invention. It is understood that the means to implement the specific functions illustrated in block diagram in FIG. 7 would be known by one of ordinary skill in the art. The thermostat switch is illustrated as 30. This could be any of the conventional types of make/break electromechanical thermostat switches discussed previously. The output of switch 30 is an on/off signal at 32. This signal controls the operation of a heat/cool unit 34. While this discussion is with reference to the operation of unit 34 in the heating mode, it is understood that the present invention is also useful in an air conditioning or cooling mode. Unit 34 functions to heat or cool the space in a house 36 or other structure. The thermostat of the present invention has a space temperature sensor 38 which, for example, may be a bimetal element with unequal expansion rates as described above. The relationship between the space temperature and a thermostat set point determines the make and break of switch 30. For example, the thermostat is typically designed to make contact when the sensed space temperature falls to the set point and break contact when the sensed space temperature exceeds the set point by a predetermined value. (See, for example, FIG. 1.) The thermostat mechanical heat anticipation control loop is illustrated at 38. It includes a stepper motor logic control circuit 40 and stepper motor 42. The on/off signal at 32 is fed to logic control circuit 40 along with a feedback signal at 44 which is indicative of the stepper motor position. The stepper motor position controls the cycling of switch 30 via mechanical displacement as described above. The feedback control loop for reducing or eliminating thermostat droop is shown at 46. The feedback loop includes a thermostat on/off counter 48, a stepper motor logic control circuit 50 and stepper motor 52. As stated above in the implementation of the present invention motors 42 and 52 as illustrated diagrammatically in FIG. 7 can be the same physical motor. The on/off signal from switch 30 is an input to the thermostat on/off counter for measurement of the duty cycle. A signal representative of the duty cycle is an input from counter 48 to logic control circuit 50. The logic control circuit 50 then generates a signal to slowly control displacement of stepper motor 52 to adjust the thermostat set point to reduce the difference between the set point and control temperature of the system.

The mechanical heat anticipation of the present invention also finds application in line voltage electric heat thermostats to improve their cycling characteristics. In this type of thermostat the physical size of the bimetal temperature sensor is often quite large and therefore sluggish in time response to temperature changes. The switch differential from make to break is often large in these thermostats. This condition is caused by the force requirements to make/break the electrical contacts that conduct substantial current. The combination of a slow thermal response sensor, a large thermostat switch differential, and large thermostat current causes excessive heat to be generated within the thermostat to achieve the desired cycling rates with a corresponding large amount of thermostat droop. This problem can be eliminated using the mechanical heat anticipation of the present invention. This would provide a desirable cycle rate to provide comfort with a reasonable amount of droop.

The present invention is thus an improved electromechanical thermostat having mechanical as opposed to thermal heat anticipation cycling characteristics. It is particularly useful in wireless thermostat applications where the thermostat uses battery power. The present invention also is an improved electromechanical thermostat with a means to mechnically reduce thermostat droop providing for a consistently comfortable environment under varying load conditions.

I claim:

1. An electromechanical thermostat for controlling the on/off cycle of a heating/cooling unit comprising:
   a temperature sensing element having a variable position according to the sensed temperature;
   switch means associated with the temperature sensing element for providing on/off signals to the heating/cooling unit according to the position of the said sensing element;
   means for varying the relative position of said sensing element and said switch means as a function of time during the on/off cycle of the unit to provide mechanical heat anticipation to control the generation of said on/off signals.

2. An electromechanical thermostat in accordance with claim 1 wherein said varying means varies the relative position in an exponential manner.

3. An electromechanical thermostat for controlling the on/off cycle of a heating/cooling unit comprising:
   a temperature sensing element having a variable position according to the sensed temperature;
   switch means associated with the temperature sensing element for providing on/off signals to the heating/cooling unit according to the position of said sensing element;
   a stepper motor connected to at least one of said sensing element and switch means and adapted to drive said one in a first direction during the on cycle and a second direction opposite said first direction during said off cycle for varying the relative position of said switch means and said sensing element to provide mechanical heat anticipation controlling the generation of said on/off signals;

a source of power connected to said stepper motor.

4. An electromechanical thermostat in accordance with claim 3 wherein said stepper motor is connected to said temperature sensing element.

5. An electromechanical thermostat in accordance with claim 3 wherein said stepper motor is connected to said switch means.

6. An electromechanical thermostat for controlling the on/off cycle of a heating/cooling unit comprising:

a temperature sensing element positioned according to the temperature detected by said element;

switch means associated with said sensing element for providing on/off signals in response to the position of said sensing element;

means for detecting the duty cycle of the heating/cooling unit and generating a signal representative thereof;

means responsive to said signal for adjusting the position of at least one of said sensing means and switch means to reduce thermostat droop.

7. An electromechanical thermostat in accordance with claim 6 further comprising means for providing mechanical heat anticipation to control the on/off cycling of said the heating/cooling unit.

8. An electromechanical thermostat in accordance with claim 7 wherein said means for providing mechanical heat anticipation comprises means for varying the position of at least one of said switch means and said temperature sensing element during the on/off cycle of the heating/cooling unit.

9. An electromechanical thermostat in accordance with claim 8 wherein said position varying means comprises a stepper motor adapted to drive said at least one of said switch means and said temperature sensing element in a first direction during the on cycle and a second direction opposite said first direction during said off cycle and a source of power connected to said stepper motor.

10. An electromechanical thermostat in accordance with claim 11 wherein said position varying means comprises a stepper motor adapted to drive one of said switch means and temperature sensing element means in an exponential displacement with time to simulate the cycling characteristics of thermal heat anticipation thermostats.

11. An electromechanical thermostat in accordance with claim 6 wherein said means adjusting the position of at least one of said sensing means and switch means causes said adjustment in a relatively slow manner to reduce thermostat droop without affecting said on/off cycling signals.

12. An electromechanical thermostat in accordance with claim 6 wherein said means responsive to said signal comprises a motor means connected to adjust its position.

13. An electromechanical thermostat in accordance with claim 12 wherein said motor means comprises a stepper motor and further comprising a battery power source connected to said stepper motor.

* * * * *

UNITED STATES PATENT AND TRADEMARK OFFICE
CERTIFICATE OF CORRECTION

PATENT NO. : 5,002,226

DATED : March 26, 1991

INVENTOR(S) : LORNE W. NELSON

It is certified that error appears in the above-identified patent and that said Letters Patent is hereby corrected as shown below:

Column 7, Line 29, delete "said".

Column 8, Line 12, delete "11" and insert --8--.

Signed and Sealed this

First Day of December, 1992

Attest:

DOUGLAS B. COMER

*Attesting Officer*  Acting Commissioner of Patents and Trademarks